United States Patent [19]

Ito et al.

[11] 4,063,253
[45] Dec. 13, 1977

[54] INK JET RECORDING APPARATUS

[75] Inventors: Syoichi Ito, Ibaraki; Toshio Tsubaki, Hitachi, both of Japan

[73] Assignee: Hitachi, Ltd., Japan

[21] Appl. No.: 664,654

[22] Filed: Mar. 8, 1976

[30] Foreign Application Priority Data

Mar. 10, 1975 Japan .................................. 50-28056

[51] Int. Cl.$^2$ ............................................. G01D 18/00
[52] U.S. Cl. ..................................................... 346/75
[58] Field of Search ............................................ 346/75

[56] References Cited

U.S. PATENT DOCUMENTS

| 3,596,276 | 7/1971 | Lovelady et al. | 346/75 X |
| 3,769,630 | 10/1973 | Hill et al. | 346/75 |
| 3,981,019 | 9/1976 | Fujimoto et al. | 346/75 |
| 3,999,188 | 12/1976 | Yamada | 346/75 |
| 4,007,463 | 2/1977 | Fujimoto | 346/75 |

*Primary Examiner*—Joseph W. Hartary
*Attorney, Agent, or Firm*—Craig & Antonelli

[57] ABSTRACT

An ink jet recording apparatus including a device for charging ink particles to enable detection of disorder in the recording, a device for detecting the thus charged ink particles at a predetermined position and for producing an output in accordance therewith. A device is provided for detecting the output for a predetermined period of time or the number of times an output is provided per a predetermined unit time as an indication of a disorder in the recording. The disorder in the recording or the anticipation of a disorder in the recording is indicated by energizing a light or according to the condition of the recording, stopping the recording operation.

4 Claims, 8 Drawing Figures

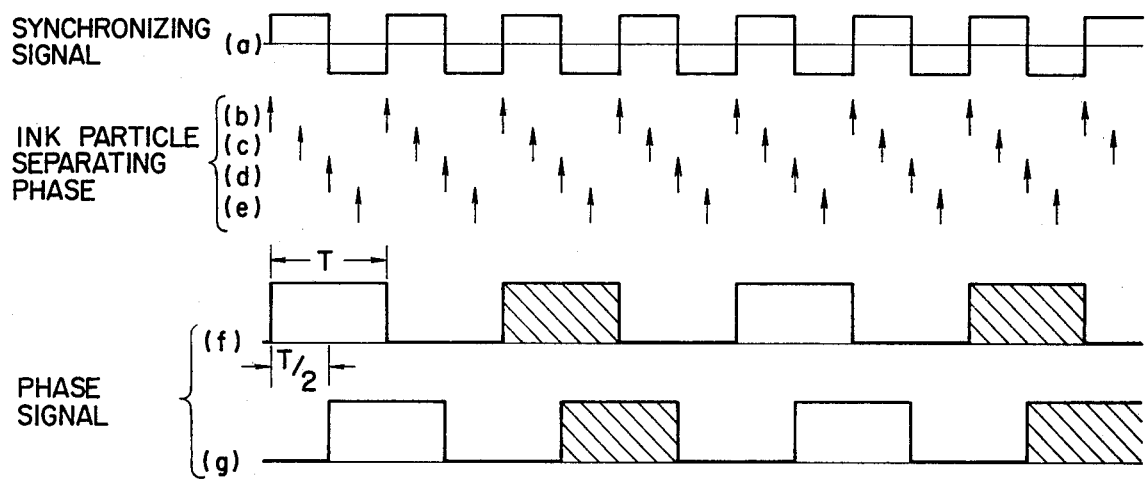
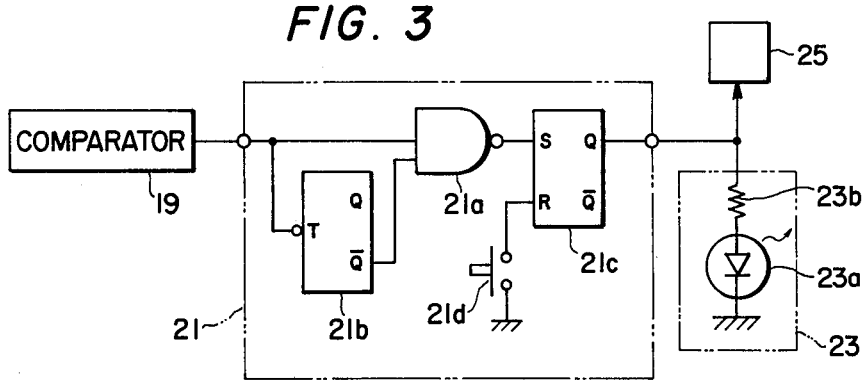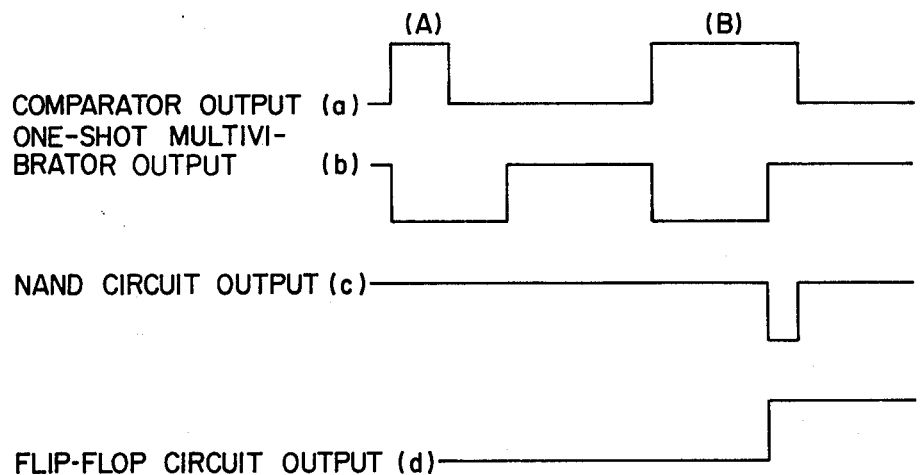

INK JET RECORDING APPARATUS

BACKGROUND OF THE INVENTION

This invention relates to ink jet recording apparatus, particularly to ink jet recording apparatus having means suitable to indicate disorder by recording.

Ink jet recording apparatus has been developed such that when an ink particle is separated from an ink plume jetted under pressure from a nozzle, the ink particle is charged by a charging electrode provided in a region where the ink particles are to be separated from the ink plume. The separation of ink particles must be synchronized with a charging phase applied to the charging electrode in accordance with recording signals. Without such synchronizing relation, the charging magnitude of ink particle does not correspond to the magnitude of recording signals, which results in a failure to obtain the deflection desired. In order to make separation of ink particles stable, the nozzle is mechanically vibrated and the phase of separation of the ink particle is matched for one of the vibrations of the nozzle, but the separation of the ink particle may widely deviate from the phase of the vibration of the nozzle, because of change of viscosity of ink particles, pressure applied to the ink, or violency of mechanical vibration of the nozzle. In such a case, some ink particles can not be charged, as a result some ink particles cannot reach a predetermined position of recording medium and thereby cause disorder in recording.

When the record is disturbed, it is desirable that the portions of the apparatus causing the unstable condition be corrected after the operation of the apparatus is stopped. However in some cases where the recording is in disorder, no recording is provided on the recording medium, whereas in some other uses, a recording with small amounts of disorder in the recording is obtained. In the former case, the condition of recording can be detected by a photo reader, but in the later case that the record is left on the recording medium but has therein a portion of the recording disorder, the apparatus for detection becomes complicated in its construction and of high cost.

Further it is desirable to indicate or provide information of a recording disorder before it appears actually, visually on the recording medium.

SUMMARY OF THE INVENTION

An object of the invention is to provide an ink jet recording apparatus in which a disorder in recording or illegible record can be detected and indicated with a simple construction.

Another object of the invention is to provide an ink jet recording apparatus in which a disorder in recording is deduced and informed by making use of the output of phase detecting apparatus employed for synchronizing the separation phase of ink particles with the phase of the recording signal.

Further another object of the invention is to provide an ink jet recording apparatus in which a disorder in recording is anticipated and informed.

According to the present invention, the improvement of the ink jet recording apparatus comprises apparatus for charging ink particles which are not used for recording, electric charge being different from one for recording in its magnitude and/or its polarity, means for detecting the charged ink particles at a predetermined position, and means for inferring and informing a record condition according to the output from the means for detecting the charged ink particles.

BRIEF DESCRIPTION OF THE DRAWINGS

FIG. 2 is a wave-form view for explanation of the operation of ink jet recording apparatus shown in FIG. 1;

FIG. 3 is an electrical block diagram of a time comparator circuit employed in the ink jet recording apparatus shown in FIG. 1;

FIG. 4 shows waveforms for explanation of FIG. 3;

DESCRIPTION OF THE PREFERRED EMBODIMENT

Figure 1:
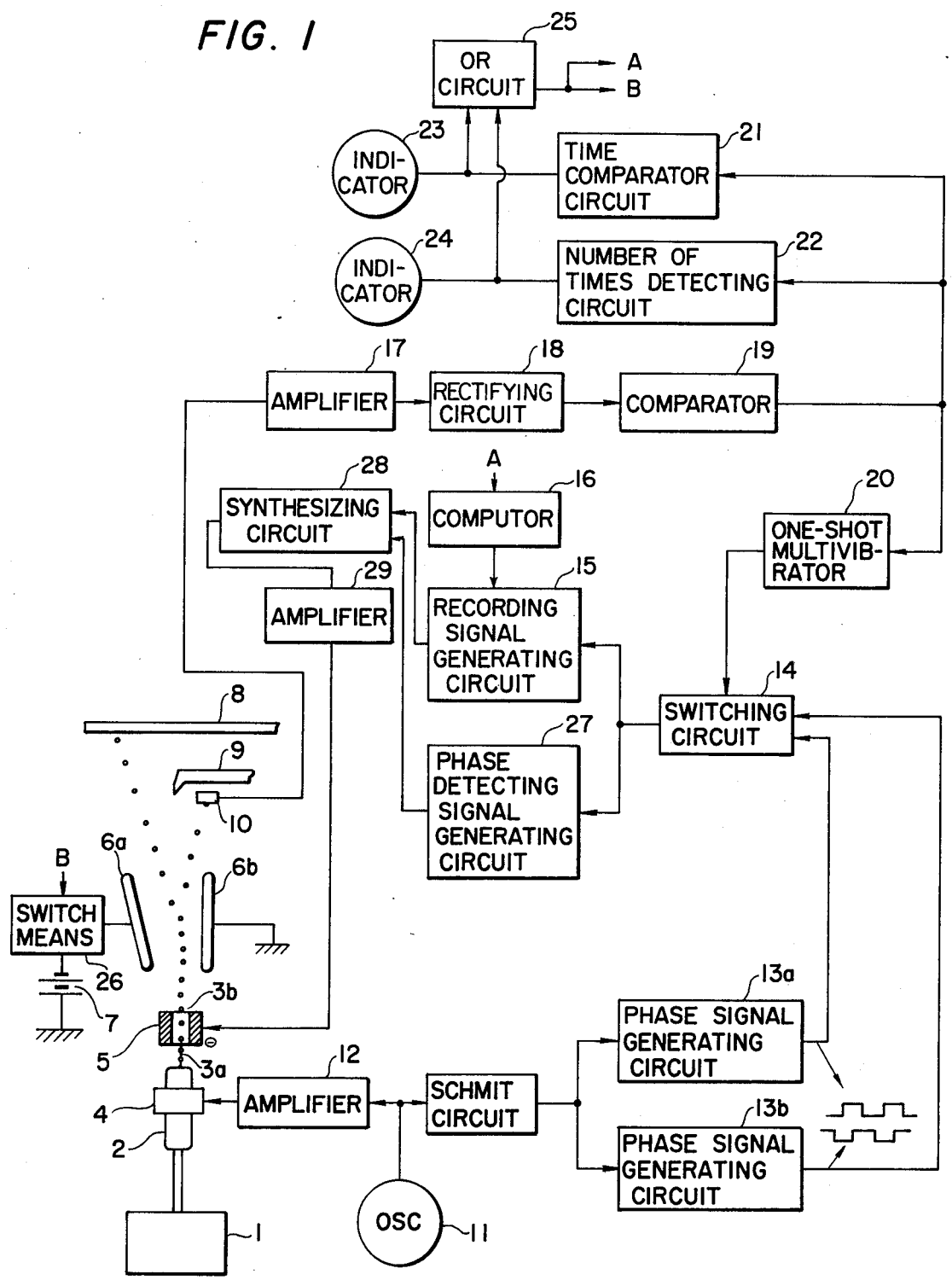
FIG. 1 is a schematic view showing an embodiment of in jet recording apparatus according to the invention wherein recording condition detecting apparatus is employed.

Referring to FIG. 1 an embodiment of the present invention will be described in detail. In FIG. 1, ink for recording is jetted in a form of ink plume, from a nozzle 2 communicating through a conduit with an ink source 1 which comprises a tank and a pump for putting ink under pressure. The nozzle 2 is mechanically vibrated by vibrator 4 such as one made of electrostricitve material which causes in the ink plume 3a contractions synchronized with the vibration. As the contraction proceeds, the ink plume 3a is divided into a ink particle 3b which is separated from the ink plume 3a. In a region wherein the ink particle 3b is separated from the ink plume 3a, there is provided a charging electrode 5 which produces capacity between the charging electrode 5 and an ink particle 3b. A pair of deflecting electrodes 6a, 6b, one 6a of which is connected to an electric source 7 through a switch means 26 to apply negative potential thereto, and the other 6b of which is connected to earth, are disposed such that the ink particle flies therebetween. Before a recording medium such as a paper 8, a gutter 9 is provided to capture ink particles which are not deflected at the deflecting electrodes 6a, 6b. Before the gutter 9, an ink senser 10 for detecting the ink particles deflected in a direction opposite to the direction of ink particles used for recording with respect to the direction of ink particles flying without deflection is provided, which sensor 10 is preferably a microphone with a vibrating plate exposed and directed toward the nozzle 2, but any such sensers as produce electric output when impinged thereon by making use of kinetic energy or electrostatic energy of ink particles, or as forms a switching function by making conductivity of the ink particles can be used.

The ink senser 10 generates a electric signal or electric output when an ink particle impinges on the vibrating plate.

Synchronizing signal generator 11 transmits its output to the vibrator 2 through an amplifier 12. The output from the synchronizing signal generator 11 further transmits its output through a Schmitt circuit to phase signal generating circuit 13a, 13b each of which generates phase signals in the form of rectangular waves of time width T each of which is equal to an ink separating period. The rectangular waves T each have a phase difference T/2 therebetween. Switching circuit 14 comprises a flip-flop circuit to transmit selectively the phase signal to both recording signal generating circuit 15, and phase detecting signal circuit 27. The switching circuit 14 is constructed so that the phase signals from the phase signal generating circuits 13a, 13b are transmitted alternatively to both recording signal generating circuit 15 and phase detecting signal generating circuit 27 at every time when signals from one shot multivibrator 20 enter the switching circuit 14. The recording signal generating circuit 15 produces, as a recording signal, an electric potential of the magnitude corresponding to the quantity of deflection to be deflected according to information signals from a computor 16, which recording signals are transmitted to the charging electrode 5 through an amplifier 29, after being synthesized with phase detecting signals produced by the phase detecting signal generating circuit 27 at a synthesizing circuit 28. When the synchronizing is carried out during recording, the recording signal and phase detecting signal are alternately transmitted to the charging electrode 5, the phase detecting signal has inverse polarity applied with respect to the recording signal. Therefore, the deflection of ink particles for phase detecting is inverse to that of the ink particles for recording.

Electric signals detected by the sensor 10 is amplified by an amplifier 17, rectified by rectifying circuit 18, then transmitted to a level detecting circuit of comparator 19 which produce outputs when the value of the signal from the senser 10 is lower than the predetermined value, for example 3V, that is, test ink particles or phase detecting particles which do not regularly impinge on the senser 10. One shot multivibrator 20 operates with the rising edge portion of an electric signal from the comparator 19 to change over phase signal transmitting circuit of the switching circuit 14.

Recording condition detecting device comprises a time comparison circuit 21 which receives an electric output of comparator 19 and produces an output for information when the electric output is outputted for a predetermined time, and the number of times detecting circuit 22 which detects the number of electric output of the comparator 19 per a unit time and produces output for information when the number per a predetermined time is beyond a predetermined number, that is, the number of times of disorder in recording per a unit time is detected. Numeral 25 is OR circuit through which an output from the time comparison circuit 21 and/or the number of times detecting circuit 22 is transmitted to the computor 16 and to switch means 26 to stop recording, in addition to providing an indication with a light.

Referring to FIG. 2, operation of the apparatus described above will be described hereinafter. When a synchronous signal (a) as shown, generated by the synchronizing signal generator 11 is transmitted to the vibrator 4 through the amplifier 12, the vibrator 4 vibrates with a period synchronized with the synchronous signal. While separation of ink particles 3b is synchronized by the vibration caused by the vibrator 4, the separating phase may change in the range of (b) to (e) by various conditions affecting ink separation. As the phase signal generating circuit 13a comprises a flip-flop circuit which is controlled by rising edge of synchronous signal (a), its output, that is, phase signal is one as shown by (g). Now, in case that the separation phase of the ink particles is between (c) and (e), phase signal (f) is selected by the switching circuit 14, and the ink particles are regularly charged with recording signal from the recording signal generating circuit 15. When a certain positive signal as the phase detecting signal to the phase signal (f) shown by hatching is applied to ink particles, the ink particles are charged to have negative potential, whereby the ink particles are deflected to the position of the ink sensor 10, and impinge on the sensor 10.

The comparator 19 is constructed such that when the ink particles impinge regularly on the sensor 10, the comparator 19 produces no output therefrom.

Therefore, while ink particles regularly impinge on the sensor 10, and the sensor 10 is making regular electric signals, the comparator 19 does not produce output.

In case that ink separation phase to the phase signal (f) is shifted as shown by (b), the magnitude of charge of ink particles is not proportional to the recording signal as well as the phase signal, which causes disorder in recording, and causes the ink particles to be far from impinging in the sensor 10. Thus, when the ink particles do not impinge on the sensor 10, the comparator 19 provides an output transmitted to the switching circuit 14 by operating the one-shot multivibrator 20 with the output, so that the switching circuit 14 is operated to transmit phase signals (g) to the recording signal generating circuit 15 and the phase detecting signal generator 27. If there is a little unstable phenomena, stable operation is restored by shifting the phase signal by phase of T/2.

However, when the apparatus (which term means ink jet recording apparatus and is used therefor hereinafter) loses largely its stability, although synchronizing is carried out by switching of the phase signal for a time, soon the apparatus falls out of synchronization so that the comparator 19 does not produce its output. In such a case, it is convenient that the time comparator circuit 21 operates to indicate unstability of the apparatus and stop recording by signals transmitted to the computor 16 and switch means 26.

When the apparatus is in a little unstable condition, synchronizing of the recording signal with the separation phase of ink particles is maintained, and the ink senser 10 detects the ink particles for a while. In such a case, the comparator 19 loses its output. Soon after, however, the apparatus comes out of synchronization of the recording signal with the separation phase of ink particles 3b and the comparator 19 begins to produce its output. The output again operates the one-shot multivibrator 20 to synchronize the recording signal with the separation phase of ink particles, with the phase signal (f) delivered. When the synchronizing is repeated many times for a short time, the apparatus is in an unstable condition, and has a danger of falling into a large unstable condition. In such a case, the number of times detecting circuit 22 is operated to indicate the unstable condition of the apparatus and transmit a signal to the computor 16 and the switch means 26 to stop recording. In this case, the apparatus is able to be permitted only to call attention without stopping the operation of the apparatus.

The synchronizing as above mentioned is carried out by controlling the phase signal controlling phase of the recording signal, but it can be carried out by controlling the separation of ink particles, with the recording signal phase fixed. The controlling of the separation phase of ink particles can be carried out by controlling the exciting phase of the vibrator 4 or the intensity of the excitation.

The recording condition detecting apparatus according to the invention will be described hereinafter.

Referring to FIG. 3 and FIG. 4, the time comparator circuit 21 will be described hereinafter in detail. In FIG. 3, reference numeral 21a is a NAND circuit; 21b, a one-shot multivibrator; 21c, a flip-flop circuit; and, 21d, a reset switch. The time comparator 21 is constructed such that an output of the comparator 19 is transmitted to both one of the input terminals of the NAND circuit 21a and to a trigger input terminal T of the one-shot multivibrator 21b; an output terminal Q of the one-shot multivibrator 21b is connected to the other input terminal of the NAND circuit 21a; the set terminal S of the flip-flop circuit 21c is connected to the output terminal of the NAND circuit 21a, and the reset terminal S is earthed through the reset switch 21d; and the output terminal of the flip-flop circuit 21c is connected to the OR circuit 25 and to the indicator 23 which includes a resistance 23b and a luminous diode 23a.

The operation of the time comparator 21 will be described hereinafter, referring to FIG. 4.

When in the comparator 19 there appears its output as shown by (A), the one-shot multivibrator 21b revises its Q output to be null (0). Therefore, the NAND circuit 21a does not change the magnitude of its output, which results in permitting the flip-flop to keep a null (0) output. If output of the comparator 19 disappears within a little unstable time, output (C) of the NAND circuit 21a is left as it is, and the flip-flop circuit 21c makes no output. However, when output of the comparator 19 does not disappear for a relatively long time as shown by (B), the one-shot multivibrator 21b comes back to the stable condition within the time to make its output (1), whereby the NAND circuit 21a makes null (0) of its output. With the null output of the NAND circuit 21a, the flip-flop circuit 21c operates to produce an output (1) from the terminal Q. The luminous diode is turned on to produce a light by the output from the flip-flop circuit 21c. The operation is reset by turning on the reset switch 21d for a while.

Figure 5:
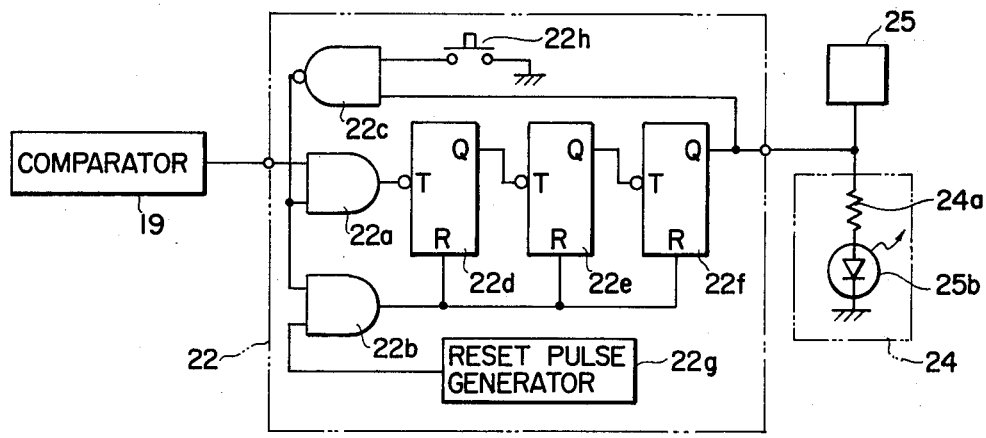
FIG. 5 is an electrical block diagram of the number of times detecting circuit employed in the ink jet recording apparatus shown in FIG. 1.
Figure 6:
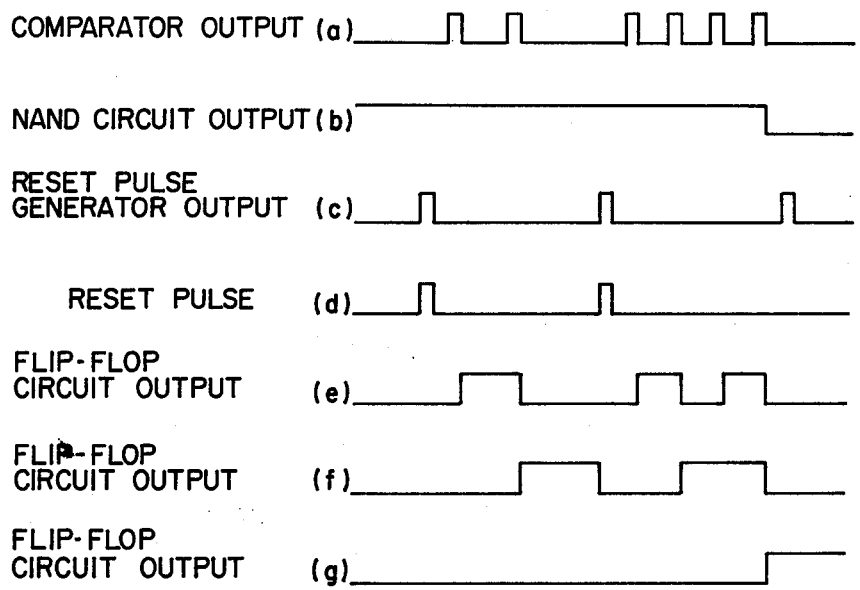
FIG. 6 shows waveforms for explanation of FIG. 5.

Referring to FIG. 5 and FIG. 6, the number of times detecting circuit 22, the indicator 24 and the operation thereof will be described hereinafter in detail.

In FIG. 5, reference numerals 22a, 22b each show an AND circuit; 22c, a NAND circuit; 22d, 22e 22f, a flip-flop circuit; 22g, a reset pulse generating circuit; and 22h, a reset switch. The flip-flop circuits 22d, 22e, 22f are connected to each other dependantly in turn to comprise a binary counter in which the last flip-flop produces (1) of output when four (4) pulses are input in the flip-flop circuit 22d. The AND circuit 22a puts in as inputs both output of the comparator 19 and output of the NAND circuit 22c which is connected to both the reset switch 22h and an output terminal of the flip-flop circuit. The AND circuit 22b puts in as input thereof outputs of the NAND circuit 22c and the reset pulse generating circuit 22g, and puts out its output to the reset terminals S of the flip-flop circuits 22d–22f. The output terminal of the flip-flop 22f is connected in series to both the OR circuit 25 and the indicator 24 including a resistor 24a and a luminous diode 25.

With the construction above-mentioned, the number of times detecting circuit 22 is operated as follows. In FIG. 6, the NAND circuit 22c usually keeps to produce (1) of output, as shown by (b). When the reset pulse generator 22g produces pulse outputs as shown by (c), the AND circuit 22b produces as output thereof reset pulses as shown by (d) to reset the flip-flop circuits 22d, 22e, 22f. A period of reset pulse production is equal to a unit time for which the number of times of disorder in recording is counted.

When a phase difference between the recording signal and separation of ink particles is produced, the comparator 19 puts out correcting signal (a) which corresponds to the output (a) as shown in FIG. 4. The signal (a) is transmitted to the trigger terminal T of the flip-flop 22d through the AND circuit 22a to operate the flip-flop 22d with rising edge of the signal (a). When the number of the correcting pulses (a) generated within the period of reset pulse (d) is within three (3), as shown in left hand of (a), the last flip-flop 22f is not triggered, therefore does not put out outputs.

However, when the number of the correcting pulses (a) comes to four (4), the last flip-flop 22f is triggered to produce output (g). The output (g) is transmitted to both the OR circuit 25 and the indicator 24 to make a light.

Since the reset switch 22h is opened, the output of the NAND circuit 22c is null (0), therefore the AND circuits 22a, 22b do not produce an output. After unstable factors of the ink-jet recording apparatus are removed, when the reset switch 22b is closed the NAND circuit 22c puts out its output which is transmitted to the flip-flop circuits 22d, 22e, 22f to again make the number of times detecting circuit 22 operatable.

As described above, the number of times detecting circuit 22 detects the number of signals produced for a predetermined time by comparator according to a unstable condition of the apparatus.

Accordingly, when the apparatus keep unstable condition for a relatively long time, the time comparator detects the unstable condition, while the number of times detecting circuit 22 detects an unstable condition of the apparatus in case where unstable conditions of relatively short time are repeated many times for a predetermined time.

Figure 7:
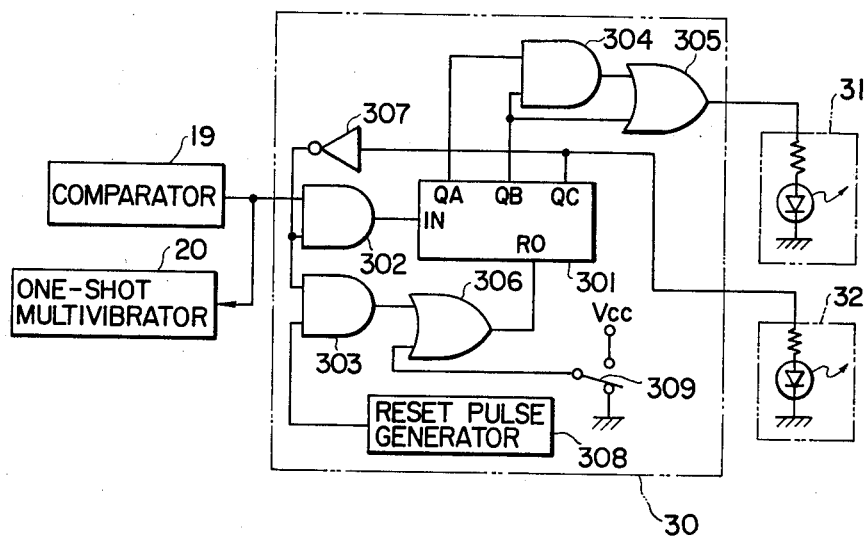
FIG. 7 is an electrical block diagram of another embodiment of recording condition detecting device according to the present invention.
Figure 8:
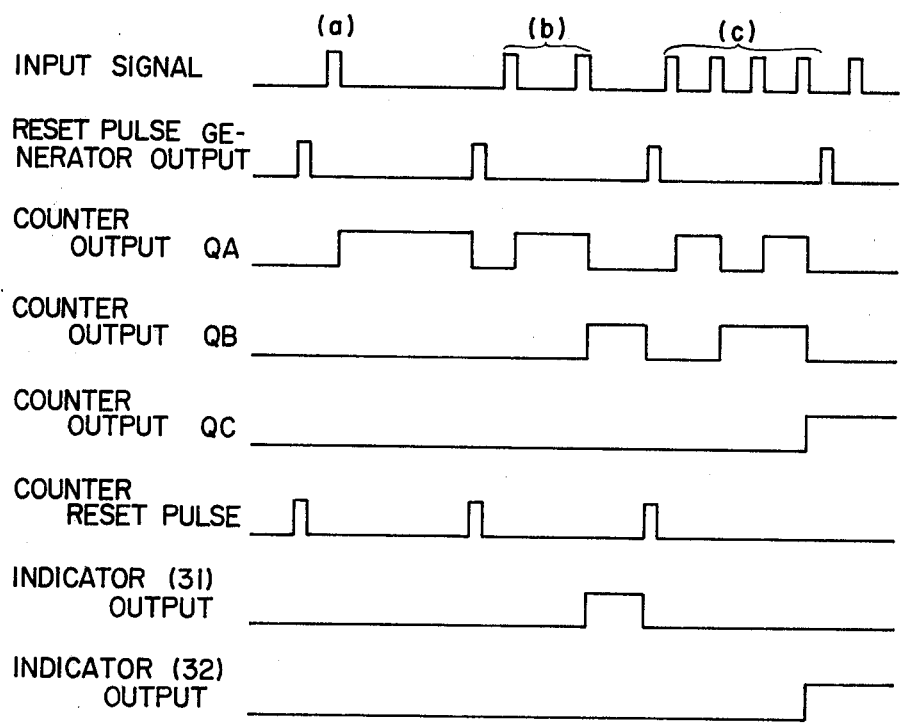
FIG. 8 shows waveforms for explanation of FIG. 7.

Referring to FIG. 7 and FIG. 8, another embodiment of recording condition detecting apparatus will be described hereinafter in detail.

In FIG. 7 showing the recording condition detecting apparatus 30, reference numeral 301 shows a three digit binary flip-flop counter (it will be called simply counter 301 hereinafter) which has one digit-output QA, two digit-output QB and three digit-output QC. IN is input terminal; RO, a reset terminal for resetting each output of flip-flop. The input terminal IN is connected to the output terminal of the comparator 19 through AND gate 302 which is inhibited by (1) of output QC of the counter 301. The reset terminal RO is connected to a reset pulse generator 308 through OR gate 306 and AND gate 303 which is inhibited by (1) of output QC of the counter 301. The reset pulse generator 308 produces pulses with a constant time interval therebetween. Numeral 307 in an inverter and numerals 304 and 305 are an AND gate and an OR gate, respectively.

In a first input terminal connected to a first indicator 31, there appears output (1) when output QB of the counter 301 represents output (1), or when outputs QA and QB simultaneously represents output (1). Further in a second input terminal connected to a second indicator 32, there appears an output when output QC of the counter 301 become output (1).

The operation of the above mentioned construction will be described hereinafter referring to FIG. 8.

In a fixed time, that is one interval of the reset pulses shown in FIG. 8, when one input signal from the comparator 19 enters the counter 301, in the first and second output terminals appears no output since output QA of the counter becomes output (1).

Next, when two signals from the comparator 19 enter the counter 301 for the fixed time, the output of the counter 301 appears (0) at QA, (1) at QB and (0) at QC, therefore in the first output terminal appears output to make a light of the indicator 31, in the second output terminal appears no output. Further when four signals enter the counter as shown by (c), the counter 301 put outs output (1) only at QA, therefore in the first output terminal appears no output, an output appears only in the second output terminal thereby turnning on the indicator 32. At the same time, a signal to the input terminal IN and the reset terminal RO of the counter 301 is closed by AND gates 302 and 303 whereby the counter is left as it is. After the apparatus is examined and fixed to be in order, the counter is reset by the reset switch 309.

Thus, the recording condition detecting apparatus 30 detects by two fixed level, that the number per unit time of signals from the comparator, that is the number of times of phase correcting for a fixed time is more than a predetermined value.

The recording condition detecting apparatus 30 can be used for anticipation of disorder in recording and information of disorder in recording by fixing the counter 301 with that proper difference of the number of signals from the comparator 19 appear in the two indicators.

What is claimed is:

1. In and ink jet recording apparatus comprising nozzle means for jetting an ink plume and for separating the ink plume into ink particles, means for charging the ink particles issued from the nozzle means in accordance with the potential of electric signals including recording signals and phase detecting signals, means for deflecting the charged ink particles, senser means disposed at a predetermined position for sensing the ink particles charged in accordance with the phase detecting signals and for producing an output in accordance therewith, comparator means for comparing the output from said senser means with a predetermined value and for producing a comparator output, and phase control means for controlling the phase of separation of ink particles and the charging thereof in accordance with the comparator output, the improvement comprising means for detecting the recording condition in accordance with the comparator output, said detecting means including at least one of time comparison circuit means for indicating a disorder in the recording when the comparator output is produced for a predetermined period of time and frequency detecting means for detecting the number of outputs from said comparator means per a predetermined unit time for indicating a disorder in recording when the number of outputs of said comparator means per the unit time reaches a predetermined number.

2. The apparatus according to claim 1, wherein said means for detecting the recording condition includes both said time comparison circuit means and said frequency detecting means.

3. The apparatus according to claim 1, wherein said phase control means includes means for generating phase signals having a rectangular wave form of time width T and means for shifting the phase signals by time width T/2 in accordance with the output of said comparator means.

4. The apparatus according to claim 1, wherein said frequency detecting means includes means for detecting the number of comparator outputs corresponding to a recording condition of disorder and providing an indication thereof and means for detecting the number of comparator outputs corresponding to a recording condition between a recording condition in order and a recording condition in disorder for providing an indication of anticipation of a recording condition of disorder.

* * * * *